(12) United States Patent
Mita (10) Patent No.: US 9,144,781 B2
(45) Date of Patent: Sep. 29, 2015

(54) FUEL PROCESSING DEVICE

(71) Applicant: Panasonic Intellectual Property Management Co., Ltd., Osaka (JP)

(72) Inventor: Yuki Mita, Osaka (JP)

(73) Assignee: Panasonic International Property Management Co., Ltd., Osaka (JP)

( * ) Notice: Subject to any disclaimer, the term of this patent is extended or adjusted under 35 U.S.C. 154(b) by 0 days.

(21) Appl. No.: 14/404,624

(22) PCT Filed: Jun. 24, 2013

(86) PCT No.: PCT/JP2013/003944
§ 371 (c)(1),
(2) Date: Nov. 30, 2014

(87) PCT Pub. No.: WO2014/002472
PCT Pub. Date: Jan. 3, 2014

(65) Prior Publication Data
US 2015/0118129 A1   Apr. 30, 2015

(30) Foreign Application Priority Data

Jun. 25, 2012 (JP) ................................. 2012-141991

(51) Int. Cl.
*B01J 8/00* (2006.01)
*B01J 8/04* (2006.01)
(Continued)

(52) U.S. Cl.
CPC .............. *B01J 19/245* (2013.01); *B01J 8/0465* (2013.01); *B01J 8/0469* (2013.01); *B01J 8/0492* (2013.01);
(Continued)

(58) Field of Classification Search
CPC .................. B01J 8/00; B01J 8/02; B01J 8/04; B01J 8/0446; B01J 8/0461; B01J 8/0465; B01J 8/0492; B01J 19/00; B01J 19/24; B01J 19/241; B01J 19/244; B01J 19/245; B01J 2208/00–2208/00017; B01J 2208/00106; B01J 2208/00168; B01J 2208/00212; B01J 2208/00221; B01J 2208/00504; B01J 2219/00; B01J 2219/24; B01J 2219/2401; C01B 2203/00–2203/0205; C01B 2203/0227–2203/0244; C01B 2203/04; C01B 2203/0435; C01B 2203/044; C01B 2203/08–2203/0816; C01B 2203/10; C01B 2203/1041–2203/1058; C01B 2203/12; C01B 2203/1258–2203/127; C01B 2203/14; C01B 2203/141; C01B 2203/142; C01B 2203/80; C01B 2203/82

See application file for complete search history.

(56) References Cited

U.S. PATENT DOCUMENTS

2001/0029735 A1   10/2001   Miura et al.
2009/0087705 A1   4/2009   Fuju et al.
(Continued)

FOREIGN PATENT DOCUMENTS

EP   2554511   2/2013
JP   2000-034103   2/2000
(Continued)

OTHER PUBLICATIONS

Machine translation of JP 2004185942A, published Jul. 2, 2004.*
(Continued)

*Primary Examiner* — Natasha Young
(74) *Attorney, Agent, or Firm* — Wenderoth, Lind & Ponack, L.L.P.

(57) ABSTRACT

Provided is a fuel processing device including: a combustion unit equipped with a heat source; a desulfurization unit for extracting a sulfur component from the source gas; a reforming unit for generating, from the desulfurized source gas, a hydrogen-containing gas having hydrogen as a main component thereof; and a low-temperature conversion unit equipped with an exothermic catalyst for reducing the impurity concentration in the hydrogen-containing gas. The reforming unit and the desulfurization unit are configured so as to surround the combustion unit, and are disposed concentrically in the given order facing outwards from the combustion unit. The present invention further includes a preheating passage which is connected to the desulfurization unit, and which is provided to a bottom part of the combustion unit via a heat insulation material, such that the source gas is preheated by heat from the combustion unit.

8 Claims, 9 Drawing Sheets

(51) Int. Cl.
*B01J 19/24* (2006.01)
*C01B 3/48* (2006.01)
*C01B 3/38* (2006.01)
*H01M 8/06* (2006.01)
*B01J 8/02* (2006.01)
*B01J 19/00* (2006.01)

(52) U.S. Cl.
CPC .............. *B01J 8/0496* (2013.01); *C01B 3/384* (2013.01); *C01B 3/48* (2013.01); *H01M 8/0675* (2013.01); *B01J 2208/0053* (2013.01); *B01J 2208/00221* (2013.01); *B01J 2208/00309* (2013.01); *B01J 2208/00504* (2013.01); *B01J 2219/24* (2013.01); *C01B 2203/0233* (2013.01); *C01B 2203/0283* (2013.01); *C01B 2203/044* (2013.01); *C01B 2203/047* (2013.01); *C01B 2203/066* (2013.01); *C01B 2203/0816* (2013.01); *C01B 2203/0883* (2013.01); *C01B 2203/1058* (2013.01); *C01B 2203/1064* (2013.01); *C01B 2203/127* (2013.01); *C01B 2203/1258* (2013.01); *C01B 2203/1288* (2013.01); *C01B 2203/142* (2013.01); *C01B 2203/82* (2013.01); *Y02E 60/50* (2013.01)

(56) References Cited

U.S. PATENT DOCUMENTS

| | | | |
|---|---|---|---|
| 2009/0258263 | A1* | 10/2009 | Fujioka et al. ................. 429/19 |
| 2009/0317671 | A1 | 12/2009 | Ukai et al. |
| 2010/0202938 | A1 | 8/2010 | Nakamura et al. |
| 2013/0065145 | A1 | 3/2013 | Goto et al. |

FOREIGN PATENT DOCUMENTS

| | | | |
|---|---|---|---|
| JP | 2003-327405 | | 11/2003 |
| JP | 2004185942 | A * | 7/2004 |
| JP | 2005-104776 | | 4/2005 |
| JP | 2008-019159 | | 1/2008 |
| JP | 2009-078954 | | 4/2009 |
| JP | 2009-088346 | | 4/2009 |
| JP | 2010-058995 | | 3/2010 |
| JP | 2011-207715 | | 10/2011 |
| WO | 2009/150792 | | 12/2009 |
| WO | 2011/122372 | | 10/2011 |

OTHER PUBLICATIONS

Extended European Search Report for application No. 13810310.6 dated Dec. 15, 2014.
International Search Report of PCT application No. PCT/JP2013/003944 dated Sep. 17, 2013.

* cited by examiner

FUEL PROCESSING DEVICE

TECHNICAL FIELD

The present invention relates to a fuel processing apparatus that generates hydrogen to be supplied to a fuel cell system.

BACKGROUND ART

A fuel cell system such as a household cogeneration system includes a fuel processing apparatus that generates hydrogen-containing gas and a fuel cell that generates electricity using the hydrogen-containing gas generated by the fuel processing apparatus (for example, see PTL1 and 2).

Figure 9:
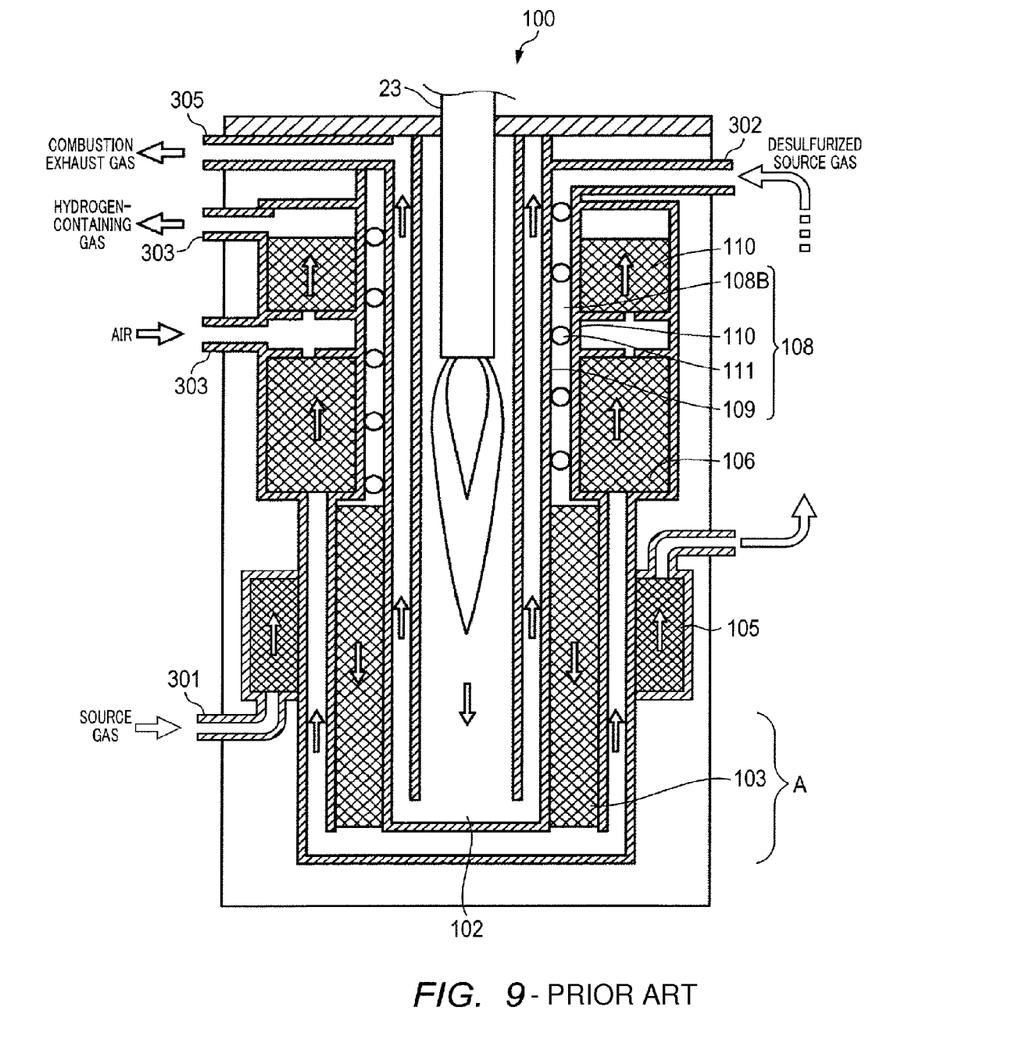
FIG. 9 is a cross-sectional view of a conventional fuel processing apparatus.

As illustrated in FIG. 9, fuel processing apparatus 100 for a conventional fuel cell system includes: combustion section 102 including burner 23; desulfurization section 105 provided to surround combustion section 102, which removes sulfur component from a source gas such as hydrogen carbonate fuel including city gas, LPG, and others; vaporization flow channel 108 in which the source gas and steam are mixed; reforming section 103 that causes a steam reforming reaction of mixed gas at a high temperature of approximately 600° C. and generates hydrogen-containing gas having hydrogen as the main component, conversion section 106 in which the concentration of carbon monoxide which is poisonous to the catalyst of a fuel cell is reduced to approximately 0.5% by the CO shift reaction, and selective oxidation section 110 that further reduces the carbon oxide concentration to approximately 10 ppm or lower by the selective oxidation reaction (for example, see PTL 3).

It is preferable that the temperature of desulfurization section 105 is set and maintained to a high temperature of 250° C. to 300° C., which is an optimum temperature for a hydrodesulfurization catalyst. In addition, it is preferable that the source gas provided to desulfurization section 105 is heated to an optimum temperature for the catalyst so as to promote the hydrodesulfurization reaction. Preheating, by the heat of the combustion section, before source fuel is supplied to the desulfurization section has been suggested (see PTL4 and PTL5).

However, as illustrated in FIG. 9, desulfurization section 105 is provided outside of fuel processing apparatus 100. Accordingly, desulfurization section 105 is easily affected by an external environment, making it difficult to set and maintain the temperature of the desulfurization section 105 at an optimum temperature. When the desulfurization section 105 is kept operating at a temperature lower than the optimum temperature, activity in hydrodesulfurization catalyst is reduced, shortening the lifetime of the hydrodesulfurization catalyst. Since the lifetime of a fuel processing apparatus is generally considered as 10 years, there has been a request for a method for reducing the influence of the temperature from external environment.

Furthermore, since a source gas at room temperature is provided to desulfurization section 105, there is a problem that the temperature of the source gas is not raised up to a temperature sufficient for hydrodesulfurization reaction.

As a means for reducing the influence of the temperature of the external environment, providing a heat insulating section at an outer periphery of fuel processing apparatus 100 (desulfurization section 105) has been considered. For example, placing the desulfurization section in a heat insulating section provided around the combustion section has been suggested (see PTL6). However, there is a problem that providing further heat insulation material to the outer periphery of fuel processing apparatus 100 increases the volume of the entire fuel cell system.

Alternatively, the amount of hydrodesulfurization catalyst added to desulfurization section 105 may be increased. However, there is a problem that the increased amount of the hydrodesulfurization catalyst added increases the size of the apparatus and the cost for the fuel processing apparatus. Furthermore, PTL7 discloses, for example, a reforming apparatus in which a vaporization section is provided to surround the reforming section. Although the invention disclosed in PTL7 can reduce the amount of heat emitted from the reforming section, an effect that the influence of the temperature on the desulfurization section from the external environment is reduced is not suggested.

A fuel processing apparatus housed inside an outer package, with a plurality of reactors closely arranged in parallel has been disclosed in PTL8 as a means for keeping the temperature of the source gas at a high temperature. According to the invention disclosed in PTL8, the reformed gas can be used for preheating the source gas. However, according to the configuration, the influence of the temperature of the external environment is reduced by a granular heat insulating material filling the outer package. Accordingly, it is difficult to miniaturize the size of the apparatus. PTL8 does not suggest that the influence of the temperature on the desulfurization section from the external environment is reduced. Accordingly, a fuel processing apparatus not easily affected by the temperature of the external environment has been needed.

Furthermore, as illustrated in FIG. 9, in a conventional fuel processing apparatus, there was a region A where no component is arranged around reforming section 103 that reaches a high temperature. Since reforming section 103 is exposed, it was necessary to provide a thick insulating material at an outer periphery of the apparatus in order to prevent the emission of heat to outside of the apparatus. The more the amount of heat insulating material, the more the volume of the apparatus becomes, despite the need for miniaturization of the apparatus. Furthermore, as illustrated in FIG. 9, conventional conversion section 106 is provided at one part. Since conversion section 106 is cooled on the inner-rim side contacting vaporization flow channel 108, exothermic reaction is mainly occurred on the upstream side of the gas. Accordingly, there is a problem that the reaction efficiency of the converter catalyst is reduced due to uneven temperature distribution in the converter catalyst. In response to the problem, a fuel processing apparatus having a catalyst with high reaction efficiency has been needed.

CITATION LIST

Patent Literature

PTL1
Japanese Patent Application Laid-Open No. 2008-019159
PTL2
US Patent Application Publication No. 2009-0317671
PTL3
WO2009/150792
PTL4
US Patent Application Publication No. 2009-0087705
PTL5
US Patent Application Publication No. 2001-0029735
PTL6
Japanese Patent Application Laid-Open No. 2000-034103

PTL7
Japanese Patent Application Laid-Open No. 2005-104776
PTL8
Japanese Patent Application Laid-Open No. 2009-88346

SUMMARY OF INVENTION

Technical Problem

It is an object of the present invention to provide a fuel processing apparatus not easily affected by a temperature of an external environment, and capable of preheating the source gas. It is another object of the present invention to provide a fuel processing apparatus having a catalyst with high reaction efficiency.

Solution to Problem

According to a first aspect of the present invention, a fuel processing apparatus includes: a combustion section having a heat source; a desulfurization section that removes sulfur component from a source gas; a reforming section that generates hydrogen-containing gas having hydrogen as a main component from the source gas desulfurized; and a low-temperature conversion section having a heat-generating catalyst that reduces an impurity concentration in the hydrogen-containing gas. The reforming section and the desulfurization section are provided surrounding the combustion section, and the reforming section and the desulfurization section are formed in order in concentric circles from the combustion section toward outside. The fuel processing apparatus further comprises a preheat flow channel provided at a bottom of the combustion section with an insulating material interposed in between and in communication with the desulfurization section, such that the source gas is preheated using heat from the combustion section.

Advantageous Effects of Invention

According to the present invention, a fuel processing apparatus not easily affected by a temperature of an external environment and capable of preheating the source gas is provided. Furthermore, according to the present invention, a fuel processing apparatus having a catalyst with high reaction efficiency is provided.

DESCRIPTION OF EMBODIMENTS

The present invention will be described as follows based on Embodiment. However, the present invention is not limited to the following Embodiment. Components with the same function or similar function are assigned with the same or similar reference numerals, and the description for the components will be omitted. Note that the drawings are schematic. Accordingly, specific dimensions and others will be determined with reference to the following description. Needless to say, relationships of dimensions of the components and ratio may be different between the drawings.

<Fuel Processing Apparatus>

Figure 1:
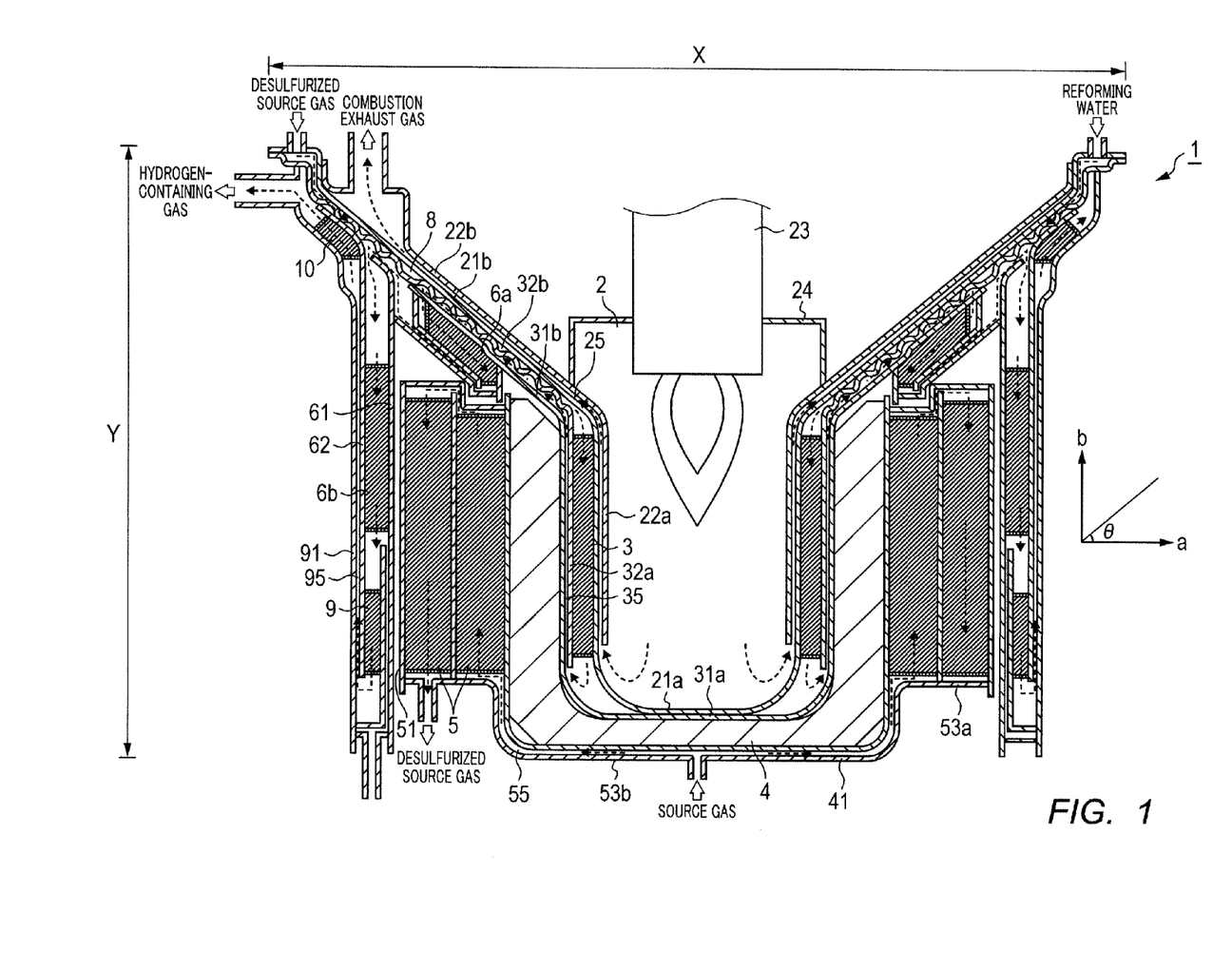
FIG. 1 is a cross-sectional view of a fuel processing apparatus according to Embodiment.

FIG. 1 is a schematic cross-sectional view of a fuel processing apparatus according to Embodiment. Fuel processing apparatus 1 according to Embodiment includes: combustion section 2 having burner 23 as a heat source; desulfurization section 5 that removes sulfur component from a source gas; reforming section 3 that generates a hydrogen-containing gas having hydrogen as main component from the desulfurized source gas; low-temperature conversion section 6b having a exothermic catalyst for reducing impurity concentration in the hydrogen-containing gas; and preheat flow channel 55 provided at the bottom of combustion section 2 via heat insulation material 4 and in communication with desulfurization section 5, such that the source gas is preheated by the heat at combustion section 2.

Fuel processing apparatus 1 further includes vaporization flow channel 8. Vaporization flow channel 8 is in communication with reforming section 3, and obliquely tilted from the upper end of reforming section 3 toward outside, and passes through a region above desulfurization section 5. The source gas and steam are mixed in vaporization flow channel 8.

Fuel processing apparatus 1 further includes: high-temperature conversion section 6a provided above desulfurization section 5 along vaporization flow channel 8, in communication with reforming section 3 and low-temperature conversion section 6b, and selective oxidation section 10 in communication with low-temperature conversion section 6b provided outside of low-temperature conversion section 6b along vaporization flow channel 8. Fuel processing apparatus 1 includes ammonia decomposition section 9 including an ammonia decomposition catalyst as an exothermic catalyst downstream of low-temperature conversion section 6b, and a pipe connecting the other end of desulfurization section 5 and one end of vaporization flow channel 8 (not illustrated).

In fuel processing apparatus 1, reforming section 3 and desulfurization section 5 are provided in circle, surrounding combustion section 2. From combustion section 2 toward outside, reforming section 3 and desulfurization section 5 are arranged in order in concentric circles. In fuel processing apparatus 1, from combustion section 2 toward outside, reforming section 3, desulfurization section 5, and low-temperature conversion section 6b are arranged in order in concentric circles.

Fuel processing apparatus 1 includes combustion section cylinder 22, first cylinder to eighth cylinder 21, 32, 31, 41, 51, 61, 62, and 91, and bottom section 53, and the components are provided to surround combustion section 2.

According to fuel processing apparatus 1, the source gas is supplied to desulfurization section 5 through preheat flow channel 55. Preheat flow channel 55 is provided next to the bottom of combustion section 2 with an insulating material in between. Accordingly, the source gas flowing through preheat flow channel 55 can be preheated before being supplied to desulfurization section 5. Accordingly, the desulfurization reaction at desulfurization section 5 proceeds efficiently.

In order to preheat the source gas more efficiently, it is preferable that preheat flow channel 55 is provided at the bottom of combustion section 2 and a part of side surface of combustion section 2 (a side surface near the bottom) with insulating material 4 in between.

According to fuel processing apparatus 1, reforming section 3 and desulfurization section 5 are provided in concentric circles from combustion section 2 toward outside. The reforming catalytic reaction at reforming section 3 requires a higher reaction temperature than a reaction temperature for desulfurization catalytic reaction at desulfurization section 5. Accordingly, in fuel processing apparatus 1, temperatures suitable for the catalytic reactions are set at reforming section 3 and desulfurization section 5.

Furthermore, according to fuel processing apparatus 1, low-temperature conversion section 6b and ammonia decomposition section 9 having an exothermic catalyst are provided at an outer periphery of desulfurization section 5. Accordingly, the hydrodesulfurization catalyst housed in desulfurization section 5 is less likely to be affected by the external environment. Accordingly, the amount of insulating material provided at an outer periphery can be reduced. Furthermore, according to fuel processing apparatus 1, by improving reaction efficiency of the desulfurization catalyst, the amount of catalyst added can be reduced and thus the apparatus can be reduced in size and weight, compared to a conventional apparatus. Furthermore, according to fuel processing apparatus 1 according to Embodiment, the activation efficiency of the reaction catalyst can be maintained at a constant value. Accordingly, it is possible to improve reliability of the apparatus.

In the following description, fuel processing apparatus 1 can be described in detail by describing each section.

(Combustion Section)

Combustion section 2 supplies heat to the entire fuel processing apparatus 1 by operating burner 23 as a heat source of fuel processing apparatus 1. Combustion section 2 includes combustion section cylinder 22, first cylinder 21 provided at an outer periphery of combustion section cylinder 22, and lid section 24 having burner 23 provided at an upper part of combustion section cylinder 22.

Combustion section cylinder 22 includes combustion section cylinder main body 22a and funnel-shaped tilted part 22b having a diameter widening from an upper opening toward the end of combustion section cylinder main body 22a. First cylinder 21 includes bottomed first cylinder main body 21a in which combustion section 2 is formed, which is provided at the outer circumference of combustion section cylinder main body 22a, and funnel-shaped (cone-shaped) first tilted section 21b having a diameter widening from the opening of first cylinder main body 21a toward the outermost periphery of fuel processing apparatus 1. The upper ends of first cylinder 21 and combustion section cylinder 22 are joined by vacuum welding, for example. Combustion exhaust gas path 25 is provided between first cylinder 21 and combustion section cylinder 22.

(Vaporization Flow Channel, Reforming Section)

Vaporization flow channel 8 generates a mixed gas by mixing the source gas desulfurized by desulfurization section 5 and steam obtained by vaporizing the reforming water. Reforming section 3 is in communication with vaporization flow channel 8, and generates hydrogen-containing gas including hydrogen as a main component from the mixed gas generated at vaporization flow channel 8. More specifically, when the source gas is a natural gas having methane as main component, steam-methane reforming reaction occurs at reforming section 3 under the heat of approximately 600° C. by combustion section 2. Subsequently, methane and steam are reformed to gas containing hydrogen, carbon monoxide, and carbon dioxide.

[Formula 1]

[Formula 2]

Figure 2:
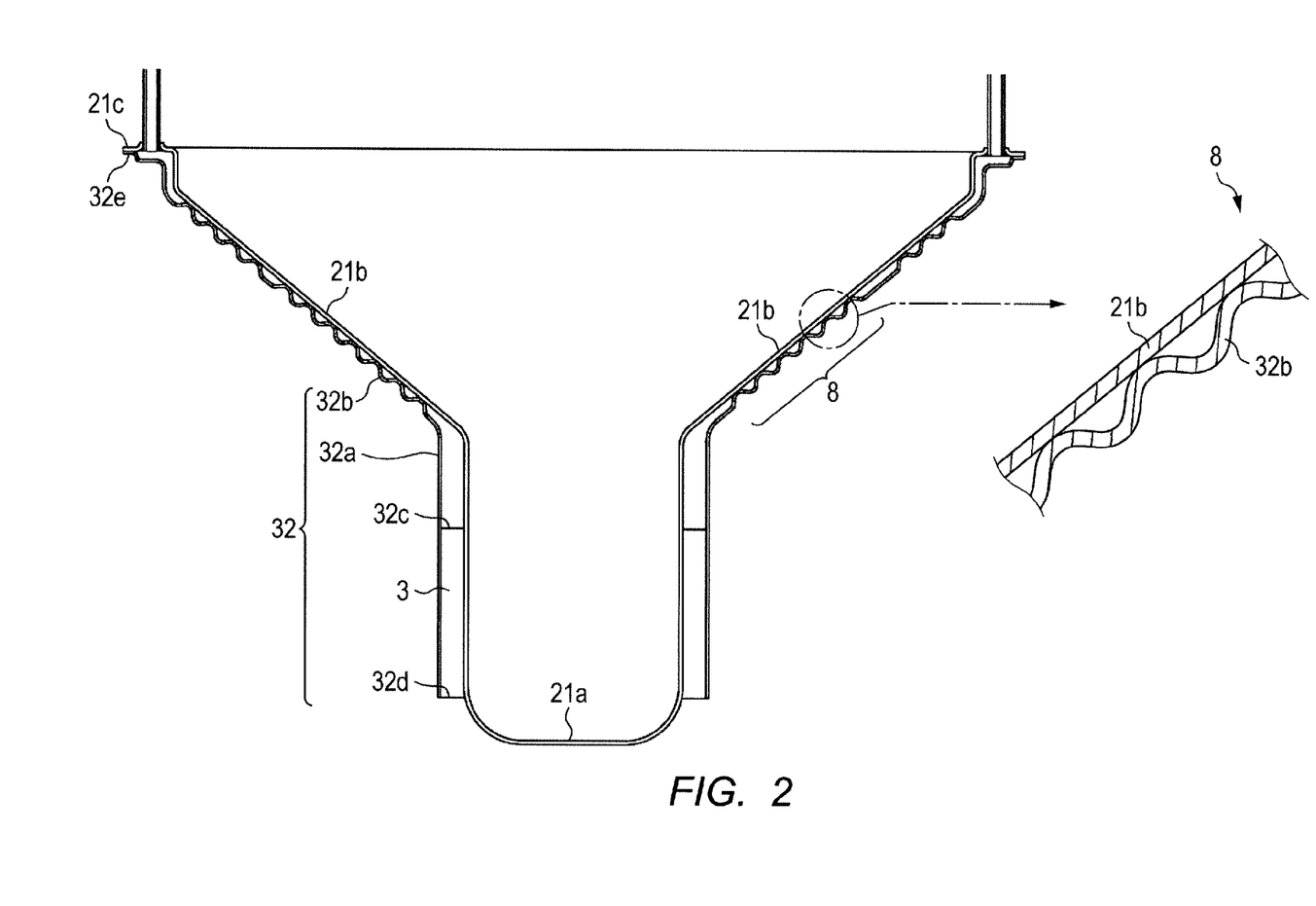
FIG. 2 is a cross-sectional view illustrating the relationship between the first cylinder and the second cylinder as a part of the fuel processing apparatus according to Embodiment.
Figure 3:
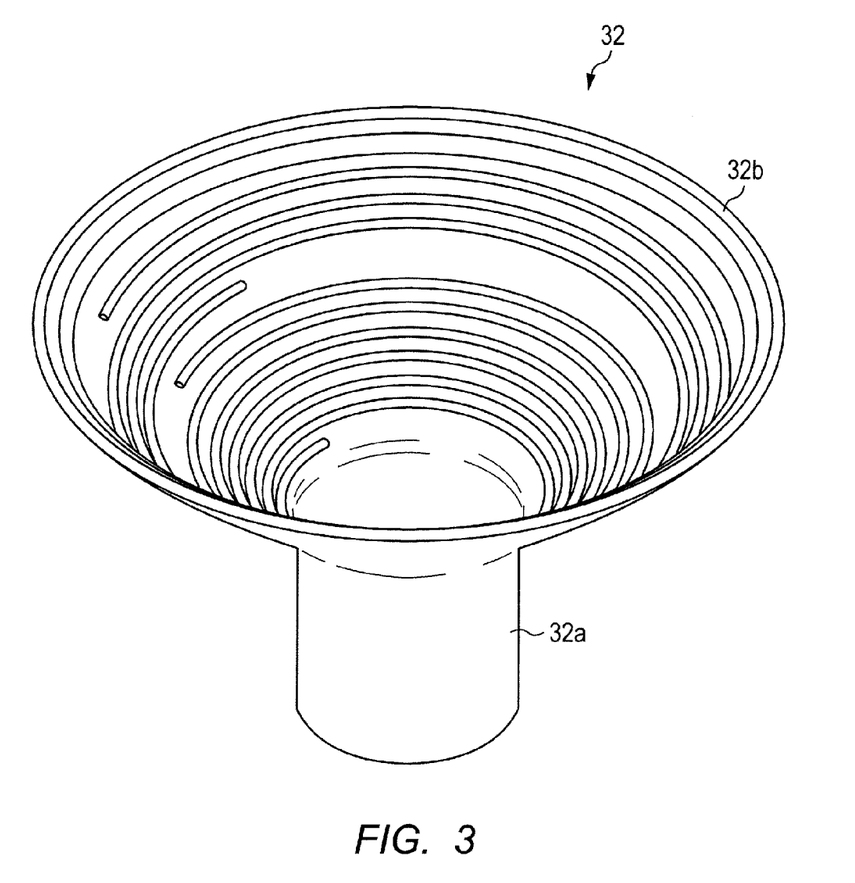
FIG. 3 is a perspective view of a part of fuel processing apparatus (spiral wavy tilted part) according to Embodiment.

Vaporization flow channel 8 includes first cylinder 21 and second cylinder 32 provided at an outer periphery of first cylinder 21. As illustrated in FIG. 2, second cylinder 32 includes second cylinder main body 32a provided at an outer periphery of first cylinder main body 21a and wavy tilted section 32b having a diameter widening from upper opening of second cylinder main body 32a toward the outermost circumference of fuel processing apparatus 1. Wavy tilted section 32b is a funnel-shaped tilted surface on which a spiral flow channel is formed. More specifically, as illustrated in FIG. 3, a spiral flow channel is provided on wavy tilted section 32b.

Upper end 32e of second cylinder 32 and upper end 21c of first cylinder 21 are joined by vacuum welding, for example. Projections of first tilted section 21b and wavy tilted section 32b are welded by brazing, for example, without any gap. Accordingly, vaporization flow channel 8 is formed in a space provided between first tilted section 21b and projecting parts of wavy tilted section 32b by first cylinder 21 and second cylinder 32.

At portions corresponding to the upper end and the lower end of reforming section 3 between second cylinder 32 and first cylinder 21, stainless steel plates 32c and 32d are joined, respectively, by welding or another method. Through holes are provided on the main surfaces of stainless steel plates 32c and 32d, allowing the gas to pass through.

As described above, reforming section 3 in communication with vaporization flow channel 8 and capable of housing a reformer catalyst is formed in a space between first cylinder main body 21a and second cylinder main body 32a. Note that, it is preferable that the upper ends 32e and 21c are joined; stainless steel plate 32c is joined with the upper end of reforming section 3. Subsequently, it is preferable that a catalyst is filled in reforming section 3, and stainless steel plate 32d is joined. Other catalyst sections (desulfurization section, conversion section, oxidation section, ammonia decomposition section, and others) can be manufactured by a similar process.

By forming spiral vaporization flow channel 8 on the tilted surface of the funnel shape, the length of vaporization flow channel 8 can be made longer than a conventional fuel processing apparatus. By increasing the length of vaporization flow channel 8, reforming water is more likely to be evaporated, and the reforming water will be mixed more easily with the source gas.

In addition, high-temperature conversion section 6a and selective oxidation section 10 are provided next to vaporization flow channel 8. In high-temperature conversion section 6a, conversion reaction which is exothermic catalytic reaction occurs. The heat generated by the catalytic reaction by high-temperature conversion section 6a is effectively absorbed by vaporization flow channel 8. Accordingly, high-temperature conversion section 6a and selective oxidation section 10 are cooled, and the temperatures of the sections are controlled at optimum temperatures. With this, the catalytic reaction proceeds efficiently.

By welding the projecting parts of first tilted section 21b and wavy tilted section 32b, a shortcut of vaporization flow channel 8 by reforming water can be prevented. Furthermore, drastic change in the temperature inside vaporization flow channel 8 can be prevented. Conventionally, after a middle cylinder is inserted between an inner cylinder and an outer cylinder, the projecting part of the middle cylinder is lengthened in height by pressing the middle cylinder in the axial direction. With this process, the middle cylinder is attached closely to the outer cylinder and the inner cylinder. However, according to Embodiment, the first tilted section 21b and projecting parts of wavy tilted section 32b are closely attached. Therefore, vaporization flow channel 8 can be formed easily without a complicated process.

Tilt angle θ of first tilted section 21b and wavy tilted section 32b (see FIG. 1) is approximately 15 degrees to approximately 75 degrees, and is preferably 30 to 50 degrees.

Fuel processing apparatus 1 can set the aspect ratio of the entire apparatus (Y/X) in a range approximately from 0.6 to 0.9, and preferably approximately from 0.65 to 0.75 by providing first tilted section 21b and wavy tilted section 32b. Considering that the aspect ratio of the conventional fuel processing apparatus is approximately in a range from 1.6 to 3.0, fuel processing apparatus 1 improves stability of setting when in use. In general, the aspect ratio that makes fuel processing apparatus 1 easy to handle is approximately 1. Accordingly, it is preferable to adjust the tilt angle θ of first tilted section 21b and wavy tilted section 32b such that the aspect ratio becomes closer to 1. Note that, the aspect ratio (Y/X) of fuel processing apparatus 1 in FIG. 1 is 235/330=0/71.

Various reformer catalysts can be used for the reformer catalyst provided in reforming section 3 without any specific limit. For example, a number of ceramic porous granular material carrying reformer catalyst such as ruthenium, nickel, platinum and others can be filled in a state that allows ventilation. As the reformer catalyst, it is preferable to use platinum catalyst in terms of a viewpoint for not generating gas that affects components or catalysts of the fuel cell at the time of reforming. However, in order to suppress the cost of fuel processing apparatus 1, it is preferable to use an inexpensive nickel (Ni) catalyst than an expensive platinum catalyst.

As the reformer catalyst, using nickel (Ni) catalyst instead of platinum catalyst reduces the cost for the apparatus. However, since ammonia gas may be generated when reforming the source gas into hydrogen gas, ammonia gas may be present in the hydrogen gas, which is problematic. When ammonia gas is present in hydrogen gas, it is likely to degrade components of the fuel cell and to make the catalyst less active. Furthermore, when the fuel cell is used in a household cogeneration system, the odor of ammonia gas may be unpleasant to users. However, according to fuel processing apparatus 1 according to Embodiment, even when the nickel catalyst is used as the reformer catalyst, ammonia gas generated can be decomposed by providing ammonia decomposition section 9. Accordingly, the problem caused by ammonia gas is solved, and the cost for the entire fuel processing apparatus 1 is reduced.

(High-Temperature Conversion Section)

High-temperature conversion section 6a reduces the carbon monoxide concentration in the hydrogen-containing gas generated by the reforming by reforming section 3. More specifically, in high-temperature conversion section 6a, as illustrated in the following formula, carbon dioxide and hydrogen are generated through the reaction of carbon monoxide and steam in the hydrogen-containing gas.

$$CO+H_2O \rightarrow CO_2+H_2 \qquad \text{[Formula 3]}$$

High-temperature conversion section 6a includes second cylinder 32 and third cylinder 31 provided at the outer periphery of second cylinder 32. Third cylinder 31 includes a bottomed third cylinder main body 31a provided at an outer periphery of second cylinder main body 32a and funnel-shaped second tilted section 31b having a diameter widening from the opening of third cylinder main body 31a toward the end. Reforming section 3 and high-temperature conversion section 6a are in communication with each other through a flow channel formed between second cylinder main body 32a and third cylinder main body 31a and a flow channel formed between spiral wavy tilted section 32b and second tilted section 31b.

Figure 4:
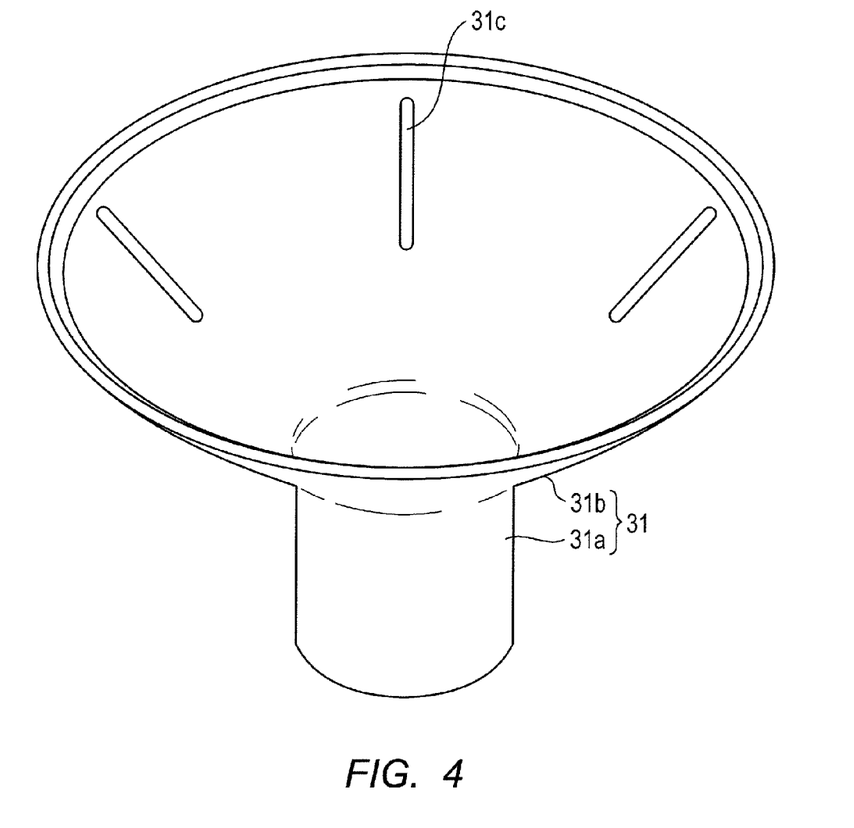
FIG. 4 is a perspective view of a part of fuel processing apparatus (third cylinder) according to Embodiment.
Figure 5:
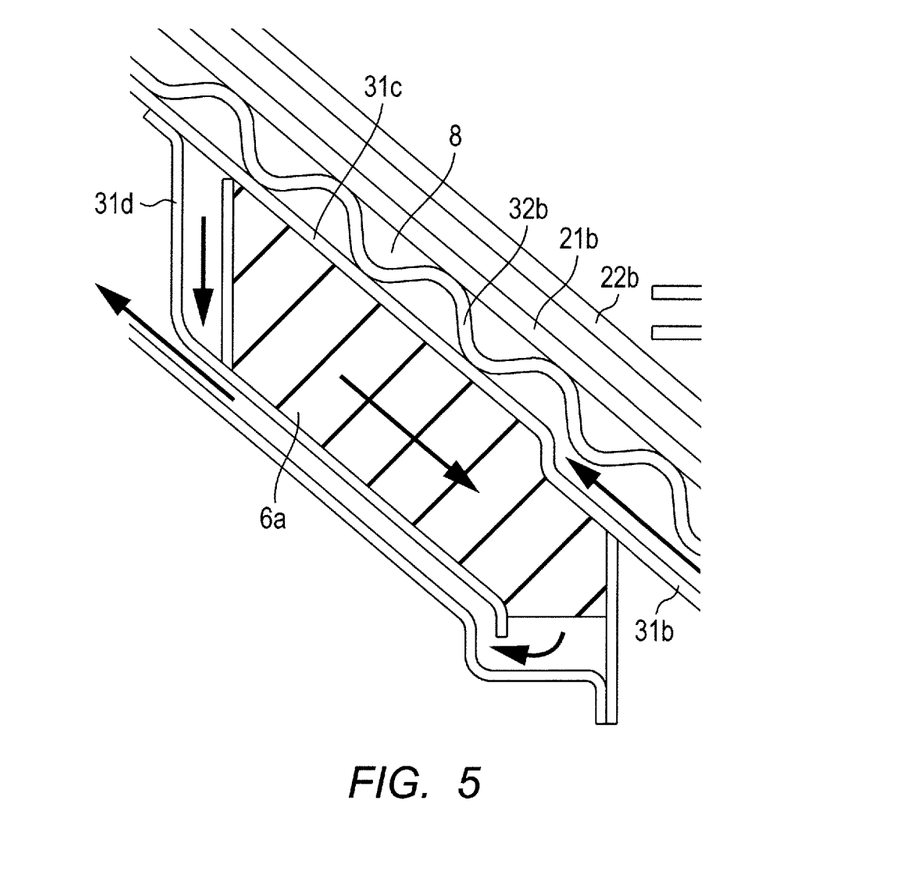
FIG. 5 is an enlarged cross-sectional view of a part of fuel processing apparatus according to Embodiment (vaporization flow channel and high-temperature conversion section)

Flow channel 31c illustrated in FIG. 4 is formed at a part of second tilted section 31b in third cylinder 31. High-temperature conversion section 6a is provided in flow channel 31c, and is adjacent to vaporization flow channel 8 through second tilted section 31b (FIG. 5). As illustrated in FIG. 5, the gas passed through flow channel 31c passes through flow channel 31d and high-temperature conversion section 6a, and turns back to low-temperature conversion section 6b.

As a high-temperature converter catalyst, a copper-based catalyst may be used.

(Desulfurization Section)

Desulfurization section 5 removes sulfur component from hydrocarbon source gas such as city gas supplied (hydrocarbon raw fuel).

Desulfurization section 5 is formed between bottomed fourth cylinder 41 and fifth cylinder 51 provided at an outer periphery of fourth cylinder 41, and a desulfurization catalyst is provided. Insulating material 4 is provided between fourth cylinder 41 and third cylinder main body 31a. At portions corresponding to the upper end and the lower end of desulfurization section 5, stainless steel plates are joined by welding, for example. A through hole is provided on the main surface of the stainless steel plate, allowing gas to pass through.

Bottom section 53 includes tabular disc-shaped bottom section main body 53a and bottomed cylinder 53b provided to surround outer circumference of a bottom of fourth cylinder 41 as a cavity at the center part of the bottom section main body 53a. Preheat flow channel 55 in communication with desulfurization section 5 is formed between fourth cylinder 41 and cylinder 53b.

As a (hydro) desulfurization catalyst, various desulfurization catalyst can be used without any specific limit. As a desulfurization catalyst, a copper-based catalyst may be used, for example.

(Low-Temperature Conversion Section, Ammonia Decomposition Section)

Low-temperature conversion section 6b is formed between sixth cylinder 61 and seventh cylinder 62. Sixth cylinder 61 is provided at an outer periphery of fifth cylinder 51, and the upper end of sixth cylinder 61 is in contact with second tilted section 31b. Seventh cylinder 62 is provided at an outer periphery of sixth cylinder 61, and the upper end of seventh cylinder 62 is in contact with second tilted section 31b. At portions corresponding to the upper end and the lower end of low-temperature conversion section 6b, stainless steel plates are joined by welding, for example. A through hole is provided on the main surface of the stainless steel plate, allowing gas to pass through.

Ammonia decomposition section 9 is formed between sixth cylinder 61 and seventh cylinder 62, and is provided on a downstream side of low-temperature conversion section 6b with regard to the direction of the gas flow.

Low-temperature conversion section 6b includes a low-temperature conversion catalyst as the exothermic catalyst. Ammonia decomposition section 9 includes an ammonia decomposing catalyst as the exothermic catalyst. As the low-temperature conversion catalyst and the ammonia decomposing catalyst, a copper-based catalyst may be used.

(Selective Oxidation Section)

Selective oxidation section 10 removes carbon monoxide remaining in the gas converted by high-temperature conversion section 6a and low-temperature conversion section 6b. More specifically, in selective oxidation section 10, carbon monoxide remaining in the gas converted at a reaction temperature of approximately 100° C. to 200° C. by the catalytic action of ruthenium or others is oxidized by oxygen in added air.

Selective oxidation section 10 is provided between eighth cylinder 91 and seventh cylinder 62. Eighth cylinder 91 is provided at an outer periphery of seventh cylinder 62, and is in communication with ammonia decomposition section 9 through flow channel 95. Selective oxidation section 10 is provided along vaporization flow channel 8 and outside of low-temperature conversion section 6b.

(Preheat Flow Channel)

Preheat flow channel 55 is formed between first cylinder 41 and bottomed cylinder 53b. It is preferable that an inlet for the source gas is provided at a part of bottomed cylinder 53b corresponding to the center axis of combustion section 2 in the gravity direction. Furthermore, preheat flow channel 55 is formed radially with the center axis of the combustion section in the gravity direction as the center. Accordingly, the source gas supplied from the source gas inlet to preheat flow channel 55 is preheated by the heat from combustion section 2. Subsequently, the preheated (for example, heated up to approximately 250° C.) source gas is supplied to desulfurization section 5. Accordingly, the desulfurization reaction at desulfurization section 5 proceeds efficiently.

Figure 6:
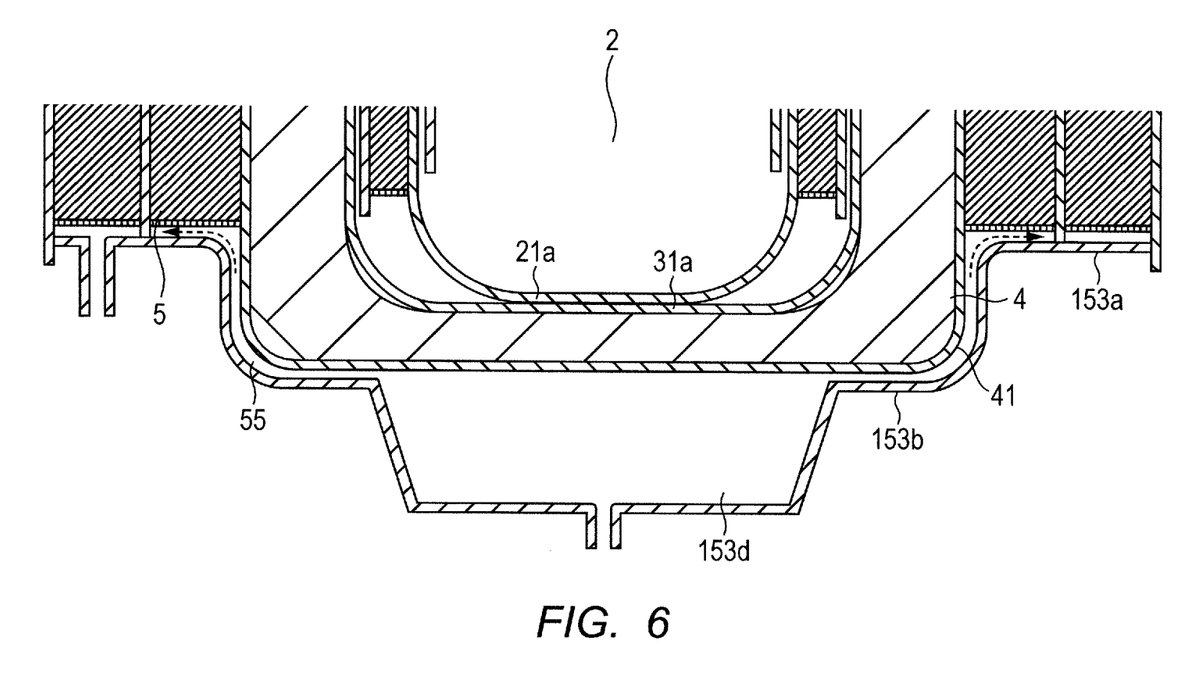
FIG. 6 is a cross-sectional view of main components of a fuel processing apparatus according to a variation of Embodiment.

The shape of preheat flow channel 55 is not limited to radial shape, as long as the supplied source gas is preheated. For example, as illustrated in FIG. 6, a reversed circular truncated cone-shaped preheat cavity 153d may be provided at a part of preheat flow channel 55. It is preferable that the center axis of combustion section 2 in the gravity direction passes through the center of the bottom surface and the upper surface of the reversed circular truncated cone defining preheat cavity 153d. Stated differently, circular truncated cone-shaped preheat cavity 153d having the center axis of the combustion section 2 in the gravity direction as the center, and a diameter widening from the center toward the outside may be provided at a part of preheat flow channel 55. Preheat cavity 153d is in communication with preheat flow channel 55 having a diameter smaller than preheat cavity 153 at the large-diameter end of the reversed truncated cone in preheat cavity 153d.

With the configuration described above, the source gas supplied from the source gas inlet flows at a low speed in preheat cavity 153d. Accordingly, the source gas is preheated easily, and the temperature is set at a constant temperature easily. Subsequently, the preheated source gas flows at high flow speed in the small-diameter preheat flow channel 55, and is supplied to desulfurization section 5. With this, the source gas is preheated reliably, reducing variation in the temperature of the source gas.

In the fuel processing apparatus according to Embodiment, the source gas supplied from the supply inlet is preheated at preheat cavity 153d, and then provided to desulfurization section 5. Accordingly, even when the amount of supply of the source gas is changed due to a sudden increase in the supply amount of the source gas or temporary discontinuation of the supply, it is easy to supply the source gas preheated to a desired temperature to desulfurization section 5.

In addition, forming preheat cavity 153d allows effective prevention of heat emission from fuel processing apparatus 1.

Figure 7:
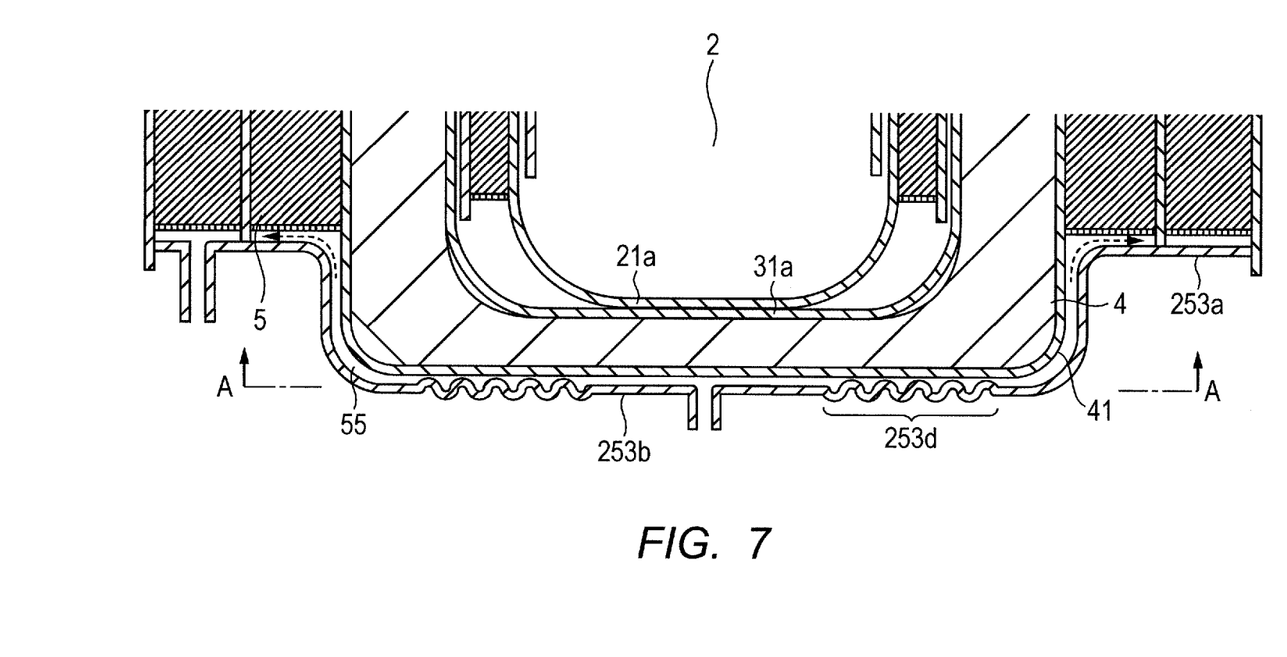
FIG. 7 is a cross-sectional view of main components of a fuel processing apparatus according to a variation of Embodiment.
Figure 8:
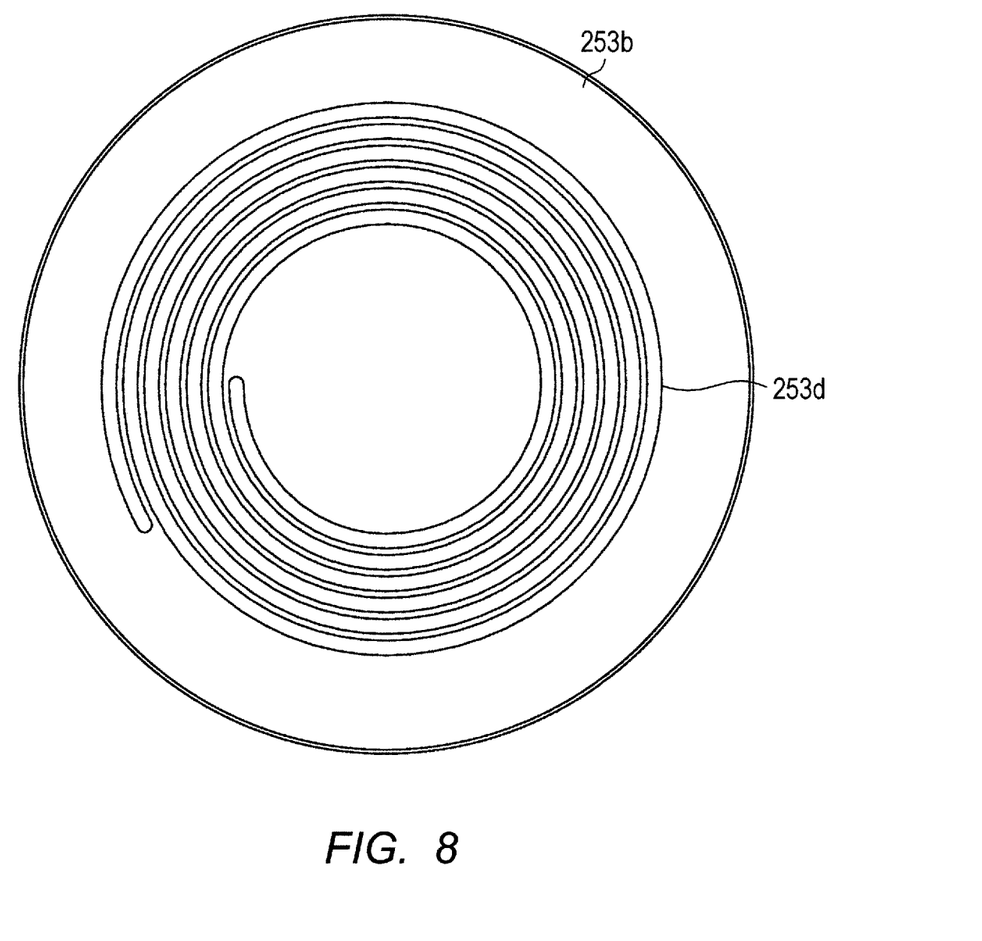
FIG. 8 is a cross-sectional view of main components of a fuel processing apparatus according to a variation of Embodiment.

Furthermore, as illustrated in FIG. 7, a part of preheat flow channel 55 may be provided as spiral flow channel 253d. As illustrated in FIG. 8, spiral flow channel 253d is formed in a spiral having the center axis of the combustion section 2 in the gravity direction as the center. By forming spiral flow channel 253d, the source gas is preheated while flowing in the circumferential direction. Accordingly, the source gas is preheated even more reliably. In addition, the variation in the temperature of the source gas can be reduced. Furthermore, the source gas can be preheated without increasing the size of fuel processing apparatus 1.

A material for forming combustion section cylinder 22, first cylinder to eighth cylinder 21, 32, 31, 41, 51, 61, 62, and 91, and bottom section 53 composing fuel processing apparatus 1 is not particularly limited as long as molding can be performed and the material is durable at the highest temperature of the component during processing. Although various materials can be used, stainless steel may be used, for example.

Fuel processing apparatus 1 can be manufactured by inserting cylinders made of stainless steel plates formed in cylinder shape with each other. Catalyst sections (reforming section 3, desulfurization section 5, high-temperature conversion section 6a, low-temperature conversion section 6b, ammonia decomposition section 9, selective oxidation section 10, and others) are formed between the cylinders, and combustion section 2 is formed. Reforming section 3 and desulfurization section 5 are provided in concentric circles having combustion section 2 as the center.

Furthermore, above desulfurization section 5 and low-temperature conversion section 6b, vaporization flow channel 8 tilted from the upper end of reforming section 3 toward the outside is provided. With this, vaporization flow channel 8 can be provided without interfering with each catalyst section.

Furthermore, pipes for connecting to external apparatuses are provided at the bottom and the side surfaces of fuel processing apparatus 1. Accordingly, when assembling the apparatus by inserting the cylinders, pipes for connecting with the external apparatuses and each catalyst section do not interfere with each other. As described above, by inserting the cylinders, fuel processing apparatus 1 can be manufactured easily.

According to fuel processing apparatus 1, when the apparatus is in operation, different temperature regions are formed in concentric circles from the combustion section 2 toward outside with combustion section 2 as the center. For example, a temperature region of 600° C., a temperature region from 250° C. to 300° C., a temperature region of 300° C., a temperature region of 200° C., and a temperature region of 150° C. are formed. Reforming section 3 may be provided in the temperature region of 600° C., desulfurization section 5 may be provided in the temperature region from 250° C. to 300° C., high-temperature conversion region 6a may be provided in the temperature region of 300° C., low-temperature conversion section 6b and ammonia decomposition section 9 may be provided in the temperature region of 200° C., and selective oxidation section 10 may be provided in the temperature region of 150° C. With this, each catalyst section is provided in a preferable temperature region for the catalyst in each catalyst section, improving the reaction efficiency of the catalyst.

In the conventional fuel processing apparatus, it is necessary to provide a thick insulating material covering the reforming section at an outer periphery of the apparatus in order to prevent the emission of heat from reforming section to outside of the apparatus. In contrast, according to fuel processing apparatus 1, ammonia decomposition section 9 and selective oxidation section 10 provided outside of the apparatus also have the insulation effect. Stated differently, according to fuel processing apparatus 1, it is possible to prevent heat dissipation and to reduce the thickness of the heat insulating material provided at an outer periphery of the apparatus compared to the conventional apparatus, thereby achieving miniaturization of the apparatus.

In the conventional fuel processing apparatus, the reaction efficiency of the converter catalyst is reduced due to variation in temperature in the converter catalyst in the conversion section. However, according to fuel processing apparatus 1, it is possible to effectively prevent the variation in temperature in the conversion catalyst, without increasing the amount of conversion catalyst by separating the conversion section into high-temperature conversion section 6a and low-temperature conversion section 6b.

In particular, by providing a high-temperature conversion catalyst in high-temperature conversion section 6a provided along vaporization flow channel 8, and providing a low-temperature conversion catalyst in low-temperature conversion section 6b, the variation in temperature can be effectively prevented. Since the heat generated by the catalytic reaction at high-temperature conversion section 6a is efficiently absorbed in vaporization flow channel 8, the catalytic reaction proceeds more efficiently. By improving the reaction efficiency of the catalyst, the amount of added catalyst can be reduced.

<Fuel Processing Method>

Next, the process for processing the source gas into hydrogen-containing gas (gas flow) will be described by describing the fuel processing method.

(Desulfurization)

First, fuel processing apparatus 1 as illustrated in FIG. 1 is prepared. Next, a source gas containing methane such as LPG and city gas is supplied from a source gas supply inlet provided at cylinder 53b at bottom section 53. The source gas is supplied to desulfurization section 5 through preheat flow channel 55. In preheat flow channel 55, the source gas is heated (preheated). The sulfur component in the source gas reacts with hydrodesulfurization catalyst stored in desulfurization section 5, and the sulfur component in the source gas is removed.

(Reforming)

The desulfurized source gas is supplied to vaporization flow channel 8 through a pipe (not illustrated) from an outlet for desulfurized source gas provided at bottom section main body 53a. At the same time, the reforming water is supplied to vaporization flow channel 8, and the reforming water is heated and vaporized. Subsequently, the desulfurized source gas and the vaporized reforming water are mixed while passing through vaporization flow channel 8, generating a mixed gas. The mixed gas obtained is supplied to reforming section 3 filled with reformer catalyst. The hydrogen-containing gas is generated from the mixed gas by the reforming reaction.

(High-Temperature Conversion)

The gas reformed from the source gas to the hydrogen-containing gas is supplied from the lower end of reforming section 3 to high-temperature conversion section 6a provided along vaporization flow channel 8 illustrated in FIG. 5 through flow channel 35. Subsequently, the gas is reacted with high-temperature conversion catalyst filling high-temperature conversion section 6a. The converted gas passed through the lower end of high-temperature conversion section 6a is introduced into low-temperature conversion section 6b.

(Low-Temperature Conversion)

In low-temperature conversion section 6b, the gas converted at a high temperature is converted again, reducing carbon monoxide in the hydrogen-containing gas. The gas passed through low-temperature conversion section 6b converted at low temperature is introduced into ammonia decomposition section 9 as an optional apparatus. Note that, the low-temperature conversion section 6b and high-temperature conversion section 6a may be continuously formed integrally.

(Ammonia Decomposition)

At ammonia decomposition section 9, remaining ammonia gas is removed from the hydrogen-containing gas. The gas passed through ammonia decomposition section 9 is introduced into selective selection section 10 provided along vaporization flow channel 8 via flow channel 95. Note that, when it is not necessary to remove ammonia from the hydrogen-containing gas, it is preferable that the same conversion catalyst used for low-temperature conversion section 6b is filled at a position of ammonia decomposition section 9. The purpose of this is to prevent the heat emission to outside of the apparatus.

(Selective Oxidation)

Carbon monoxide gas remaining in the gas is removed further at selective oxidation section 10. Selective oxidation section 10 accompanies exothermic reaction, and is provided next to vaporization flow channel 8. Accordingly, the heat generated by the catalytic reaction at selective oxidation section 10 is efficiently absorbed in vaporization flow channel 8. Accordingly, the temperature of selective oxidation section 10 is controlled to an optimum temperature, and thus the catalytic reaction proceeds efficiently.

The hydrogen-containing gas is generated as described above. The fuel cell system functions by supplying the hydrogen-containing gas to a power generating stack in a fuel cell through pipes (not illustrated).

Other Embodiments

The present invention has been described above with reference to Embodiment. However, it should not be understood that the description and drawings included as a part of the disclosure has a limiting effect on the present invention. The disclosure articulates various alternative embodiments, examples, and operation technologies for a person skilled in the art.

For example, a fuel cell system including fuel processing apparatus 1 described in Embodiment as a part can be manufactured.

In fuel processing apparatus 1, a circular truncated cone shaped space defined by tilted section 22b and lid section 24 is formed above combustion section 2. By providing a tank capable of storing the reforming water in this space allows preheating the reforming water using the heat at combustion section 2. In addition, since heated reforming water is provided above combustion section 2, heat emission from fuel processing apparatus 1 can also be prevented. With this, a fuel processing apparatus having smaller influence from external environment and a catalyst having high reaction efficiency can be provided.

Conventionally, in vaporization flow channel 8, the reforming water may not be sufficiently heated, not be evaporated in the vaporization flow channel, and may wet the surface of the reformer catalyst. When the surface of the reformer catalyst is wet, the contact area of the catalyst and the gas is reduced, possibly making the catalyst less active. Furthermore, when the catalyst is wet, the moisture may degrade the catalyst, and may interrupt the reforming of the source gas. However, by preheating the reforming water, the reforming water is sufficiently heated and is evaporated easily. Accordingly, the conventional problem is solved, and the source gas is effectively reformed into hydrogen gas.

Needless to say, the present invention includes various embodiments that have not been described herein. Accordingly, the technical scope of the present invention is determined merely by the features of the invention according to the appended claims reasonably arrived based on the description above.

INDUSTRIAL APPLICABILITY

According to the present invention, a fuel processing apparatus capable of preheating the source gas and not easily affected by a temperature of an external environment is provided. Furthermore, according to the present invention, a fuel processing apparatus with a catalyst having high reaction efficiency is provided.

REFERENCE SIGNS LIST

1 Fuel processing apparatus
2 Combustion section
3 Reforming section
5 Hydrodesulthrization section
6a High-temperature conversion section
6b Low-temperature conversion section
8 Vaporization flow channel
9 Ammonia decomposition section
10 Selective oxidation section
23 Burner
22 Combustion section cylinder
21 First cylinder
32 Second cylinder
31 Third cylinder
41 Fourth cylinder
51 Fifth cylinder
61 Sixth cylinder
62 Seventh cylinder
91 Eighth cylinder
53 Bottom
55 Preheat flow path
153d Preheat cavity
253d Spiral flow channel

The invention claimed is:

1. A fuel processing apparatus comprising:
a combustion section having a heat source;
a desulfurization section that removes sulfur component from a source gas;
a reforming section that generates hydrogen-containing gas having hydrogen as a main component from the source gas desulfurized; and
a low-temperature conversion section having a heat-generating catalyst that reduces an impurity concentration in the hydrogen-containing gas, wherein:
the reforming section and the desulfurization section are provided surrounding the combustion section, and the reforming section and the desulfurization section are formed in order in concentric circles from the combustion section toward outside, and
the fuel processing apparatus further comprises a preheat flow channel provided at a bottom of the combustion section with an insulating material interposed in between and in communication with the desulfurization section, such that the source gas is preheated using heat from the combustion section.

2. The fuel processing apparatus according to claim 1, further comprising a preheat cavity at a part of the preheat flow channel, the preheat cavity having a reversed truncated cone shape with a center axis of the combustion section in a gravity direction as a center and a diameter widening from the center toward outside.

3. The fuel processing apparatus according to claim 2, wherein an end of the preheat cavity on a large-diameter radial direction side is in communication with the preheat flow channel having a diameter smaller than a diameter of the preheat cavity.

4. The fuel processing apparatus according to claim 1, wherein the preheat flow channel is formed radially from a center axis of the combustion section in a gravity direction as a center.

5. The fuel processing apparatus according to claim 1, wherein the preheat flow channel is formed in a spiral from a center axis of the combustion section in a gravity direction as a center.

6. The fuel processing apparatus according to claim 1, wherein the preheat flow channel includes a source gas inlet at a part corresponding to a center axis of the combustion section in a gravity direction.

7. The fuel processing apparatus according to claim 1, wherein the preheat flow channel is provided to cover the bottom of the combustion section and a part of a side of the combustion section.

8. The fuel processing apparatus according to claim 1, wherein the reforming section, the desulfurization section, and the low-temperature conversion section are formed to surround the combustion section, and the reforming section, the desulfurization section, and the low-temperature conversion section are provided in order in concentric circles from the combustion section toward outside.

* * * * *